United States Patent
Egami et al.

(10) Patent No.: US 7,670,055 B2
(45) Date of Patent: Mar. 2, 2010

(54) SLIDING BEARING

(75) Inventors: Masaki Egami, Kuwana (JP); Seiji Shimizu, Aichi-ken (JP); Toshihiko Tanaka, Aichi-ken (JP)

(73) Assignee: NTN Corporation, Osaka-Fu (JP)

( * ) Notice: Subject to any disclaimer, the term of this patent is extended or adjusted under 35 U.S.C. 154(b) by 768 days.

(21) Appl. No.: 10/561,662

(22) PCT Filed: Jun. 10, 2004

(86) PCT No.: PCT/JP2004/008504

§ 371 (c)(1),
(2), (4) Date: May 15, 2006

(87) PCT Pub. No.: WO2004/111476

PCT Pub. Date: Dec. 23, 2004

(65) Prior Publication Data

US 2006/0251348 A1    Nov. 9, 2006

(30) Foreign Application Priority Data

Jun. 10, 2003  (JP) ............................. 2003-165388
Jun. 7, 2004   (JP) ............................. 2004-168902

(51) Int. Cl.
*F16C 33/02*     (2006.01)
*F16C 33/06*     (2006.01)
*F16C 33/22*     (2006.01)

(52) U.S. Cl. ..................... 384/279; 384/280; 384/297

(58) Field of Classification Search ............... 384/13, 384/276–279, 294–295, 450, 910, 912; 428/553, 428/564, 570, 677, 687, 935
See application file for complete search history.

(56) References Cited

U.S. PATENT DOCUMENTS

| 5,322,742 | A | * | 6/1994 | Fujisawa et al. | 428/687 |
| 5,324,596 | A | * | 6/1994 | Fujisawa et al. | 428/687 |
| 5,501,526 | A | * | 3/1996 | Asai et al. | 384/13 |
| 5,605,050 | A | * | 2/1997 | Tatematsu et al. | 62/131 |
| 6,086,257 | A | * | 7/2000 | Lee | 384/279 |

(Continued)

FOREIGN PATENT DOCUMENTS

DE    3640328 A1 *   6/1988

(Continued)

*Primary Examiner*—Marcus Charles
(74) *Attorney, Agent, or Firm*—J.C. Patents

(57) ABSTRACT

A cam follower includes a shaft member which is cantilevered at one end and a slide bearing fitted onto the outer periphery of the other end of the shaft member. The slide bearing is composed of a cylindrical matrix made of an Fe-based sintered metal material having an Fe content of 90 wt % or more and a slide layer formed from the inner peripheral surface to the both end faces of the matrix. The slide layer is made of a slide material composition having a base material such as polyethylene resin blended with a lubricant such as silicone oil and a globular porous silica impregnated with this lubricant.

20 Claims, 1 Drawing Sheet

U.S. PATENT DOCUMENTS

| | | | |
|---|---|---|---|
| 6,089,755 A * | 7/2000 | Okamoto et al. | 384/276 |
| 6,197,432 B1 * | 3/2001 | Fujita et al. | 428/553 |
| 6,235,413 B1 * | 5/2001 | Dosaka et al. | 428/687 |
| 6,377,770 B1 * | 4/2002 | Hirose et al. | 399/286 |
| 6,527,447 B2 * | 3/2003 | Obara | 384/297 |
| 6,648,515 B2 * | 11/2003 | Whitney | 384/294 |
| 6,905,779 B2 * | 6/2005 | Sakai et al. | 428/564 |
| 6,981,798 B2 * | 1/2006 | Katagiri et al. | 384/294 |
| 2003/0031579 A1 * | 2/2003 | Shikata et al. | 419/2 |

FOREIGN PATENT DOCUMENTS

| | | | |
|---|---|---|---|
| DE | 4311634 A1 * | 10/1993 | |
| EP | 291691 A1 * | 11/1988 | |
| JP | 60069324 A * | 4/1985 | |
| JP | 60091027 A * | 5/1985 | |
| JP | 01055427 A * | 3/1989 | |
| JP | 03107617 A * | 5/1991 | |
| JP | 04015296 A * | 1/1992 | |
| JP | 04160224 A * | 6/1992 | |
| JP | 09025935 A * | 1/1997 | |
| JP | 09078522 A * | 3/1997 | |
| JP | 09112560 A * | 5/1997 | |
| JP | 09229067 A * | 9/1997 | |
| JP | 2001059544 A * | 3/2001 | |
| JP | 2002295471 A * | 10/2002 | |
| JP | 2002364647 A * | 12/2002 | |
| WO | WO 9321450 A1 * | 10/1993 | |

* cited by examiner

SLIDING BEARING

BACKGROUND OF THE INVENTION

1. Field of the Invention

The present invention relates to a slide bearing having high accuracy, excellent sliding characteristics and strength characteristics.

2. Description of the Related Art

Slide bearings made of Cu-based, Cu—Sn-based and Fe—Cu-based sintered metal materials have been known as slide bearings having high rotational accuracy. When the slide bearing is used after a bearing member made of a porous sintered metal material is impregnated with a lubricant (sintered oil-containing bearing), the lubricant can be continuously supplied to a sliding portion between the bearing and a shaft member. The bearing member made of a sintered metal material can improve in processing accuracy and is suitable for use in a portion requiring rotational accuracy.

Resin slide bearings manufactured by mixing a solid lubricant such as PTFE, graphite or molybdenum disulfide, lubricating oil or wax with a resin material are also known as slide bearings.

Further, slide bearings having a resin layer on a predetermined surface of a matrix made of a sintered metal material are also known (see JP 2002-364647 A (hereinafter referred to as "Patent Document 1"), for example).

When a shaft member to be supported is made of a soft metal material such as aluminum alloy material, a slide bearing made of a sintered metal may damage the sliding surface of the shaft member.

In the case of using a resin slide bearing, the above problem does not occur. However, since resin materials typically have a larger linear expansion coefficient and higher water absorptivity than metal materials, when the use temperature range of the resin slide bearing is wide, a backlash between the bearing and the shaft member due to the shrinkage of the resin material during use at a low temperature and the outer diameter of the bearing may increase due to the expansion of the resin material during use at a high temperature. When the outer diameter of the bearing is restricted by a housing or the like, the inner diameter of the bearing shrinks, thereby causing the so-called "clamping" of the bearing to the shaft member in some cases. Since the slide space between the shaft member and the slide bearing is changed by volume expansion caused by water absorption, it is difficult to use the slide bearing in fields that require rotational accuracy such as a field of office equipment.

A slide bearing having a resin layer on a predetermined surface of a matrix made of a sintered metal material makes it possible to eliminate the above inconvenience. When using in the devices in which the outer peripheral surface of a matrix comes into contact with a mating member to roll or slide, such as cam followers, the outer peripheral surface of the matrix tends to be damaged due to the insufficient strength of the matrix.

SUMMARY OF THE INVENTION

It is therefore an object of the present invention to provide a slide bearing which has high dimensional accuracy and rotational accuracy, rarely attacks a shaft member made of a soft metal and is excellent in mechanical strength and durability.

In order to achieve the above mentioned object, the present invention provides a slide bearing including a matrix made of a metal and a slide layer formed on a predetermined surface of the matrix and having a bearing surface which slides with a shaft member, in which the matrix has a contact surface which rolls or slides over a mating member and is made of an Fe-based sintered metal material.

Since the matrix is made of an Fe-based sintered metal material, high dimensional accuracy and rotational accuracy can be obtained. In addition, since a slide layer formed on a predetermined surface of the matrix includes a relatively soft material such as a resin material or elastomer as a base material and slides with a shaft member on the bearing surface, even when the shaft member is made of a soft metal, the sliding surface of the shaft member is not damaged. Since the Fe-based sintered metal material has higher mechanical strength than a Cu-based or the like sintered metal material, the contact surface of the matrix which rolls or slides over the mating member is hardly damaged, and high durability is obtained.

The term "Fe-based" as used herein means that the content of Fe is 90% or more in terms of weight. As far as this condition is satisfied, other component such as Cu, Sn, Zn or C may be contained. The term "Fe" includes stainless steel.

The matrix made of an Fe-based sintered metal material can be formed by molding raw material metal powders having the above content of Fe (a small amount of a binder may be added as required to improve moldability and releasability) into a predetermined form, degreasing the molded product, baking it to obtain a sintered member and carrying out a post-treatment such as sizing on the sintered body as required. There are a large number of pores in the inside of the matrix due to the porous structure of the sintered metal, and the surface of the matrix has a large number of surface openings formed with the inside pores open to the outside. In general, the matrix is cylindrical, the shaft member is inserted into the inner periphery of the cylindrical matrix, and the contact surface which rolls or slides over the mating member is formed on the outer periphery of the matrix. A lubricant or the like may be impregnated into the inside pores of the matrix by vacuum impregnation or the like.

The slide layer is formed on the predetermined surface of the matrix and has a bearing surface which slides with the shaft member. Particularly when a slide material composition forming the slide layer includes a resin as a base material, a molten resin composition forming the slide layer enters the pores inside the surface layer from the surface openings on the predetermined surface of the matrix to be solidified at the time of molding the slide layer. Thereby, the slide layer firmly adheres to the surface of the matrix by a kind of anchor effect, making it possible to suppress the peeling and falling of the slide layer caused by sliding with the shaft member and to thereby obtain high durability.

The surface of the matrix, at least the predetermined surface where the slide layer is to be formed preferably has a surface opening ratio of 20 to 50%. When the surface opening ratio is lower than 20%, the above anchor effect for the slide layer is not sufficiently obtained and when the surface opening ratio is higher than 50%, the required dimensional accuracy and mechanical strength are not obtained. The term "surface opening ratio" means the ratio of the total area of surface openings per the unit area of the surface (area ratio). The surface opening ratio may be the same on the entire surface of the matrix or may differ between the predetermined surface thereof on which the slide layer is to be formed and the other surface thereof.

A product of {linear expansion coefficient (° $C.^{-1}$) of slide material composition forming slide layer} and {thickness of slide layer ($\mu$m)} of the slide layer is preferably 0.15 or less, more preferably 0.13 or less, much more preferably 0.10 or less. When the above value is larger than 0.15, the slide gap between the shaft member and the slide layer becomes relatively large due to the dimensional change of the slide layer caused by temperature variations and water absorption, thereby changing the torque or reducing the rotational accuracy. When a resin is used as a base material, the thickness of the slide layer which can be molded (resin layer) is about 50 μm. When the thickness of the slide layer is smaller than about 50 μm, molding becomes difficult. Therefore, the above value is preferably 0.003 or more, more preferably 0.01 or more, much more preferably 0.015 or more.

The sliding layer is formed, preferably of a synthetic resin, elastomer, or the like superior in a sliding property as a base material. The synthetic resin that can be used as the base material includes polyethylene resins such as low density polyethylene, high density polyethylene, and ultrahigh molecular weight polyethylene, a denatured polyethylene resin, a water crosslinking polyolefin resin, a polyamide resin, an aromatic polyamide resin, a polystyrene resin, a polypropylene resin, a silicone resin, a urethane resin, a polytetrafluoroethylene resin, a chlorotrifluoroethylene resin, a tetrafluoroethylene/hexafluoropropylene copolymer resin, a tetrafluoroethylene/perfluoroalkylvinylether copolymer resin, a vinylidene fluoride resin, an ethylene/tetrafluoroethylene copolymer resin, a polyacetal resin, a polyethylene terephthalate resin, a polybutylene terephthalate resin, a polyphenylene ether resin, a polycarbonate resin, an aliphatic polyketone resin, a polyvinyl pyrolidone resin, a polyoxazoline resin, a polyphenylene sulfide resin, a polyethersalfone resin, a polyetherimide resin, a polyamideimide resin, a polyetheretherketone resin, a thermoplastic polyimide resin, a thermosetting polyimide resin, an epoxy resin, a phenol resin, an unsaturated polyester resin, and a vinyl ester resin. Further, a mixture of two or more materials selected from the above-descried synthetic resins, such as a polymer alloy, can also be used as the base material. Of those, a polyethylene resin has extremely excellent low-friction property, so it is suitable for the base material. In addition, a polyethylene resin containing a component having ultrahigh molecular weight is preferably used in further consideration of resistance to abrasion.

The above slide layer may be formed like a film. In this case, resins which can dissolve or disperse in an organic catalyst may be advantageously used out of the exemplified synthetic resins. Initial condensates whose molecular weight is increased to a high molecular weight by a curing reaction at the time of forming a film may also be used.

The base material described above can be blended with a lubricant such as a solid lubricant or lubricating oil to improve further lubricity. Examples of the solid lubricant out of the lubricants that can be used include an amino acid compound, a polyoxybenzoyl polyester resin, a polybenzoimidazol resin, a liquid crystal resin, a pulp of an aramide resin, polytetrafluoroethylene, black lead, molybdenum disulfide, boron nitride, and tungsten disulfide. The lubricating oil, used typically, etc. can be used as the lubricant, and examples thereof include mineral oils such as a spindle oil, refrigerating machine oil, turbine oil, machine oil, and dynamo oil, hydrocarbon based-synthetic oils such as a polybutene oil, poly a olefin oil, alkyl naphthalene oil, and alicyclic compound oil, or non-hydrocarbon based-synthetic oils such as an ester oil of a natural fat and oil and polyol, phosphate oil, diester oil, polyglycol oil, silicone oil, polyphenylether oil, alkyldiphenylether oil, alkylbenzene oil, and fluoridated oil. Further, those lubricants may be impregnated inside the internal pores of the matrix to allow lubrication of the sliding portion by exuding the lubricant to the bearing surface through the sliding layer.

Since the sliding state with the sliding mating member can be made boundary lubrication with lubricating oil when lubricating oil in particular is blended with the base material of the above slide layer, the friction can be further reduced as compared with a case where the above solid lubricant is blended.

However, when only a lubricant is blended with the above base material, the following problem may occur. That is, at the use of the slide layer made of a slide material composition blended with a lubricant such as lubricating oil, when a lubricant oil layer appears to the sliding surface as the slide layer is gradually worn down, the lubricating oil oozes out to the surface of the sliding portion. Since it is difficult to control the oozing-out of the lubricating oil, a stable supply of the lubricating oil to the sliding surface is difficult. After the lubricating oil oozes out, pores may cause a reduction in the strength of the slide layer. To cope with this, in the present invention, a lubricant is blended with the base material of the slide material composition for forming the slide layer and further a porous silica impregnated with a lubricant is blended with the base material.

According to this constitution, a large number of advantages as follows can be obtained. (1) Excellent friction and wear characteristics can be stably provided since the lubricant can be continuously supplied to the sliding surface. (2) The amount of the lubricant contained in the slide material composition can be increased by blending the lubricant with the base material as far as moldability can be ensured, and further blending the porous silica impregnated with the lubricant (especially lubricating oil). (3) Inconveniences such as the slippage of a screw at the time of injection molding, a long cycle time due to unstable metering, low dimensional accuracy and the poor finishing of the molded surface due to the adhesion of the lubricant to the surface of a mold can be avoided especially when the base material is a resin as compared with a case where a large amount of a lubricant is merely blended because the lubricant is held in spaces in the porous silica by blending a porous silica impregnated with the lubricant. (4) The base material and the lubricant can be used in combination by impregnating the lubricant into spaces in the porous silica even when there is some problems with compatibility between the base material and the lubricant.

Various porous silicas such as a precipitating silica (for example, primary particle diameter of 15 nm or more) which can be impregnated with and can hold a lubricant may be used as the above porous silica. Of those, a globular porous silica having interconnected pores is preferred, and a spherical porous silica is particularly preferred. The term "globular" means a ball having a ratio of the short diameter to the long diameter of 0.8 to 1.0, and the term "spherical" means a ball more spherical than globular.

Since the globular porous silica is destroyed by shear force on the sliding surface when it is exposed to the sliding surface, even when the mating member is made of a soft material (including a soft metal), the mating member is not damaged. When taking into consideration that the blending of a reinforcement material with a slide material composition prepared by blending those fillers with the base material, if the lubricant and the reinforcement material are blended alone and kneaded separately, the lubricant is localized at the interface between the reinforcement material and the base material (for example, a synthetic resin), thereby making it impossible to sufficiently obtain a reinforcing effect by the reinforcement material. However, when a reinforcement material is kneaded with a lubricant and a porous silica, particularly with a globular porous silica impregnated with a lubricant, the amount of the lubricant localized at the interface between the reinforcement material and the base material can be greatly reduced, thereby obtaining a desired reinforcing effect.

When the above globular porous silica is used, attention must be paid to its size. For example, when the average particle diameter of the globular porous silica is smaller than 0.5 µm, the amount of the lubricant impregnated is insufficient, causing a problem with work efficiency. When the average particle diameter is larger than 100 µm, the dispersibility of the porous silica in the slide material composition in a molten state is low. An agglomerate of primary particles is destroyed by the shear force applied when the slide material composition in a molten state is kneaded, whereby the globular shape of the porous silica may not be maintained. From these points of view, the average particle diameter of the above globular porous silica, particularly spherical porous silica is preferably 0.5 to 100 µm. Especially when handling ease (work efficiency) and slide characteristics are taken into consideration, the average particle diameter is more preferably 1 to 20 µm. Spherical silica particles having the above average particle diameter can hold the sufficient lubricant therein and can supply the lubricant held therein to the sliding surface little by little. The spherical porous silica having the above average particle diameter can be obtained, for example, by emulsifying an alkali silicate aqueous solution containing an alkali metal salt or alkali earth metal salt in an organic catalyst and gelatinizing the emulsified product with a carbonic acid gas. The primary particle diameter of the spherical porous silica obtained herein is 3 to 8 nm.

The above porous silica has a specific surface area of preferably 200 to 900 $m^2/g$, more preferably 300 to 800 $m^2/g$ from the viewpoint of high oil absorptivity (high lubricant retainability). It may have a pore area of 1 to 3.5 ml/g and a pore diameter of 5 to 30 nm, preferably 20 to 30 nm. Further, it has an oil absorptivity of preferably 150 to 400 ml/100 g, more preferably 300 to 400 ml/100 g. In consideration of use under the normal atmosphere, it is preferable that even when the porous silica is dried again after it is immersed in water, its pore volume and oil absorptivity be maintained at 90% or more of the values before immersion. The specific surface area and the pore volume are values measured by a nitrogen adsorption method and the oil absorptivity is a value measured in accordance with JIS K5101.

It is extremely preferable that the porous silica used in the present invention be spherical and has the above average particle diameter, specific surface area, pore area, pore diameter, and oil absorptivity. However, a non-globular porous silica may be used without a problem if its average particle diameter, specific surface area, oil absorptivity, and the like fall within the above ranges. Similarly, a porous silica having an average particle diameter of about 1,000 µm may be used without a problem depending on its compatibility with the base material and its blending ratio. Alternatively, a porous silica which is subjected to a surface treatment of organic or inorganic type may also be used even if it has a problem with its compatibility with the base material. Examples of the porous silica which can be used preferably include Sunsphere manufactured by ASAHI GLASS CO., LTD., Got Ball manufactured by SUZUKI YUSHI Industrial Co., LTD., and Sylosphere manufactured by FUJI SILYCIA CHEMICAL LTD. The Microid manufactured by Tokai Chemical Industry Co., Ltd. may also be used as the porous silica.

Various lubricants including lubricating oil may be used as described above. Out of those, silicone oil is particularly preferably used as it has heat resistance to the temperature of kneading and molding the slide material composition (particularly resin composition), extremely excellent friction characteristics and compatibility with a silanol group (Si—OH) remaining on the surface or the inside of the above porous silica. According to this, as silicone oil is easily held in the inside of the above porous silica, higher oil retainability is obtained. As the silicone oil, either of silicone oil having no functional group and silicone oil having a functional group may be used.

The porous silica is contained in the above slide layer in an amount of preferably 1 to 20 vol %, more preferably 2 to 15 vol % in terms of the effect of holding the lubricant and strength. The content of the lubricant in the slide layer is preferably 5 to 40 vol %. When the content of the lubricant is lower than 5 vol %, a lubricating effect exerted by means of the lubricant becomes unsatisfactory and when the content is higher than 40 vol %, the amount of the base material becomes small and strength may greatly lower. The weight of a substance blended can be calculated by multiplying the vol % of the substance with its density. The vol % of the porous silica is a value obtained on the supposition that a non-porous silica is blended. That is, it is calculated not from the bulk specific gravity of the porous silica but from the true specific gravity. Therefore, the actual vol % of the porous silica having pores therein is larger than the above value.

A suitable filler may also be added to the base material to improve friction and wear characteristics and to reduce a linear expansion coefficient, in addition to the porous silica or lubricant. Examples of the filler to be added include fibers such as a glass fiber, carbon fiber, pitch-based carbon fiber, PAN-based carbon fiber, aramid fiber, alumina fiber, polyester fiber, boron fiber, silicon carbide fiber, boron nitride fiber, silicon nitride fiber, metal fiber, asbestos, and coal wool, a fabric knitting thereof, minerals such as calcium carbonate, talc, silica, clay, and mica, inorganic whiskers such as a titanium oxide whisker, aluminum borate whisker, potassium titanate whisker, and calcium sulfate whisker, and various heat resistant resins such as carbon black, black lead, a polyimide resin, and polybenzoimidazol. Further, for the purpose of improving thermal conductivity of a sliding layer, a carbon fiber, metal fiber, black lead powder, zinc oxide, or the like may be added to the base material. In addition, carbonates such as lithium carbonate and calcium carbonate, or phosphates such as lithium phosphate and calcium phosphate may be blended. Note that plural fillers can be used in combination.

Additives which can be widely used for synthetic resins may be used together as far as the effect of the present invention is not impaired. For example, industrial additives such as a release agent, flame retardant, antistatic agent, weatherability accelerator, antioxidant and colorant may be suitably added. As far as the lubricity of the slide layer is not impaired, an intermediate product or a final product may be modified to improve its properties by separately performing a chemical or physical treatment such as annealing.

Conventionally known methods may be used to knead the above slide material composition, especially a resin composition. For example, a mixer such as a Henschel mixer, ball mill or tumbler mixer may be used to mix a resin composition and the composition is supplied into an injection molding machine or melt extruder (for example, a twin-screw extruder) having high melt mixing capability, or a heat roller, kneader, Banbury mixer, melt extruder or the like may be used to melt mix the resin composition in advance. Alternatively, vacuum molding, blow molding, foam molding, multi-layer molding and heat compression molding may be carried out. To knead the base material (here, resin) with a porous silica and a lubricant, the order of kneading them is not particularly limited. Preferably, after a porous silica and a lubricant are kneaded together to contain the lubricant in the porous silica, the resulting kneaded product is kneaded with the base material. Since the porous silica readily absorbs moisture or water, it is preferably dried before kneading. The drying means is not particularly limited and drying in an electric furnace or vacuum drying may be employed.

When the above slide layer is formed in, for example, a film form, a porous silica impregnated with a lubricant is blended with a synthetic resin base material and then mixed with an ordinary coating solution. General-purpose coating means may be used for coating. For example, various means such as spraying, electrostatic coating, or flow immersion method may be employed.

When the porous silica is pre-mixed with the lubricant, if the lubricant has high viscosity, the lubricant hardly infiltrates into the globular porous silica. In this case, the lubricant is diluted with a suitable solvent which can dissolve the lubricant, and the dilute solution is infiltrated into the porous silica and dried gradually to vaporize the solvent so as to impregnate the lubricant into the inside of the porous silica. Alternatively, when the lubricant is lubricating oil, the porous silica is immersed in the lubricating oil and pulled in vacuum to forcibly infiltrate the lubricating oil into the inside of the porous silica. When the lubricant is solid at normal temperature, it is heated at a suitable temperature to be molten and impregnated into the porous silica. Even when the lubricant is liquid at normal temperature, if its viscosity is high, it is heated at a suitable temperature to reduce its viscosity so as to be impregnated into the porous silica. Those methods can be effectively used. A liquid resin such as an unsaturated polyester resin is mixed with an oil-containing globular porous silica, the resultant mixture is impregnated into fabrics, and an assembly of those fabrics may be used as the slide layer.

According to the present invention, there can be provided a slide bearing which has high dimensional accuracy and rotational accuracy, rarely attacks a shaft member made of a soft metal and is excellent in mechanical strength and durability.

DETAILED DESCRIPTION OF THE PREFERRED EMBODIMENTS

Hereinafter, preferred embodiments of the present invention will be described.

Figure 1:
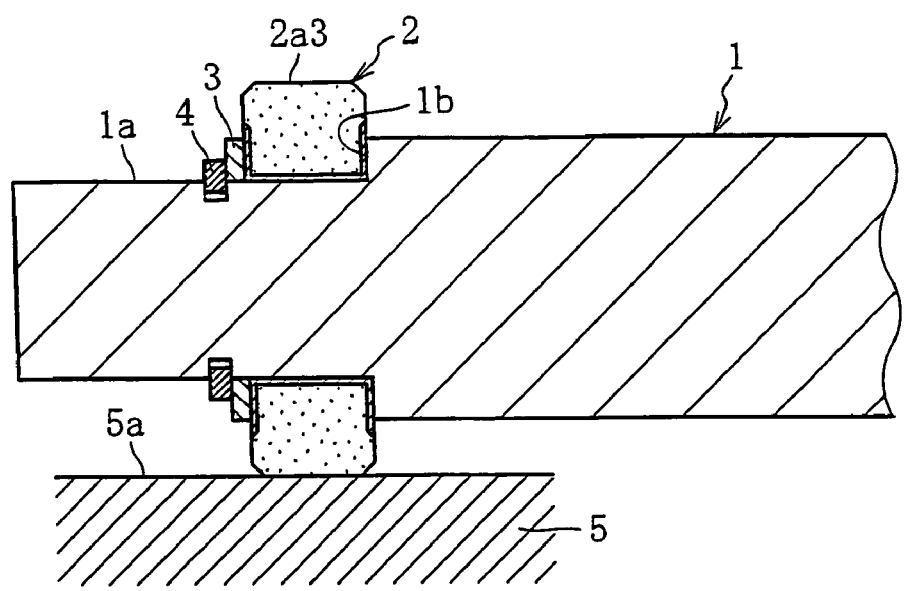
FIG. 1 is a sectional view of a cam follower according to an embodiment of the present invention.

FIG. 1 shows a cam follower according to an embodiment of the present invention. This cam follower includes a shaft member (stud) 1 which is cantilevered at one end (not shown) and a slide bearing 2 fitted onto the outer periphery of the other end portion of the shaft member 1.

The shaft member 1 is made of a soft metal material such as a brass or an aluminum alloy and the other end portion thereof has a small-diameter outer peripheral surface 1a and a shoulder portion 1b.

Figure 2:
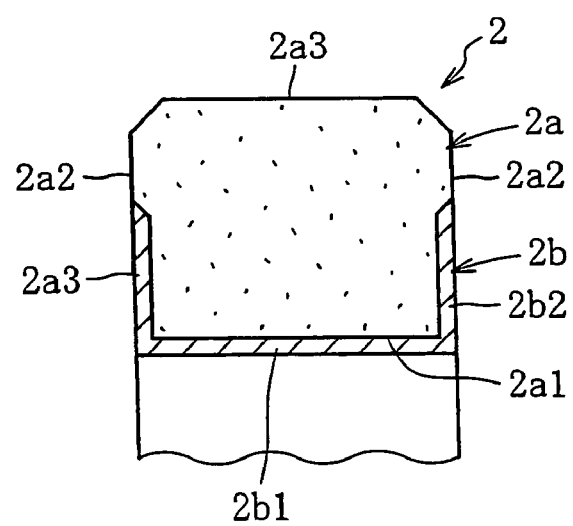
FIG. 2 is a sectional view of a slide bearing according to an embodiment of the present invention.

As shown in FIG. 2, the slide bearing 2 is composed of a cylindrical matrix 2a made of an Fe-based sintered metal material having an Fe content of 90 wt % or more and a slide layer 2b formed from the inner peripheral surface 2a1 to the both end surfaces 2a2. The slide layer 2b is made of a slide material composition including a base material such as polyethylene resin blended with a lubricant such as silicone oil and a globular porous silica impregnated with this lubricant. In this embodiment, the slide bearing 2 is formed by insert molding the above slide material composition (resin composition) on the above surface of the matrix 2a. The slide layer is not formed on the outer peripheral surface 2a3 of the matrix 2a. The above lubricant may be impregnated into pores in the inside of the matrix 2a.

As shown in FIG. 1, the slide bearing 2 is fitted onto the outer peripheral surface 1a of the shaft member 1, and its movement in the axial direction is restricted by the shoulder portion 1b of the shaft member 1 and a thrust washer 3 and a slip-off preventing ring 4 fitted onto the outer peripheral surface 1a of the shaft member 1. The thrust washer 3 is made of, for example, a resin material having excellent slide characteristics, and the slip-off preventing ring 4 is made of a soft metal material such as an aluminum alloy.

The outer peripheral surface 2a3 of the matrix 2a of the slide bearing 2 comes into contact with the contact surface 5a of a mating member 5 such as a cam or guide rail and rolls or slides over the contact surface 5a. At this point, the slide bearing 2 rotates around the shaft member 1 and this rotation is rotatably supported by the sliding of the slide layer 2b with respect to the shaft member 1. That is, an area of the slide layer 2b formed on the inner peripheral surface 2a1 of the matrix 2a comes into contact with the outer peripheral surface 1a of the shaft member 2 and functions as a radial bearing face 2b1 for supporting a radial load. At the same time, areas of the slide layer 2b formed on both end faces 2a2 of the matrix 2a come into contact with the shoulder portion 1b of the shaft member 1 and the thrust washer 3 and function as thrust bearing faces 2b2 and 2a3 for supporting a thrust load, respectively.

The slide layer 2b of the slide bearing 2 may have only the radial bearing face 2b1 or may have only one of the thrust bearing faces 2b2 and 2a3 in addition to the radial bearing face 2b1. That is, the slide layer 2b may be formed only on the inner peripheral surface 2a1 of the matrix 2a or from the inner peripheral surface 2a1 to one of the end faces 2a2 of the matrix 2a.

TABLE 1

| | Number | linear expansion coefficient 1/° C. | thickness of resin layer, μm | coefficient[1] | amount of specific wear/×10$^{-8}$ mm$^3$/(N · m) | wear of shaft |
|---|---|---|---|---|---|---|
| Example | 1 | 0.00013 | 250 | 0.0325 | 80 | Not existent |
| | 2 | 0.00013 | 500 | 0.065 | 80 | Not existent |
| | 3 | 0.00013 | 770 | 0.1001 | 80 | Not existent |
| | 4 | 0.00013 | 900 | 0.117 | 80 | Not existent |
| | 5 | 0.00013 | 1,150 | 0.1495 | 80 | Not existent |
| | 6 | 0.00013 | 250 | 0.0325 | 80 | Not existent |

TABLE 1-continued

| Number | | linear expansion coefficient 1/° C. | thickness of resin layer, μm | coefficient[1] | amount of specific wear/×10⁻⁸ mm³/(N·m) | wear of shaft |
|---|---|---|---|---|---|---|
| | 7 | 0.00013 | 250 | 0.0325 | 50 | Not existent |
| | 8 | 0.00013 | 250 | 0.0325 | 30 | Not existent |
| | 9 | 0.00013 | 250 | 0.0325 | 20 | Not existent |
| Comparative | 1 | — | — | — | >10,000 | existent |
| Example | 2 | 0.00013 | Integrated with resin | — | 80 | Not existent |
| | 3 | 0.00013 | 1,600 | 0.208 | 80 | Not existent |
| | 4 | 0.00013 | 500 | 0.07 | Cannot be tested | — |
| | 5 | 0.00013 | 250 | 0.0325 | Cannot be tested | — |
| | 6 | 0.00013 | 250 | 0.0325 | Cannot be tested | — |
| | 7 | 0.00013 | 250 | 0.0325 | 600 | Not existent |
| | 8 | 0.00010 | 250 | 0.0325 | 1,100 | existent |

[1]coefficient = linear expansion coefficient of resin (1/° C.) × thickness of resin layer (μm)

TABLE 2

| Number | | friction coefficient | judgment on dimensional change | dimensional change of specimen, μm | | space, μm | |
|---|---|---|---|---|---|---|---|
| | | | | −10° C. | 60° C. | −10° C. | 60° C. |
| Example | 1 | 0.08 | ○ | 0.3 | −0.3 | 25.5 | 12.6 |
| | 2 | 0.08 | ○ | 1.2 | −1.6 | 26.5 | 11.3 |
| | 3 | 0.08 | ○ | 2.3 | −3.1 | 27.6 | 10.5 |
| | 4 | 0.08 | ○ | 2.9 | −3.9 | 28.2 | 10.2 |
| | 5 | 0.08 | ○ | 4.0 | −5.3 | 29.3 | 9.7 |
| | 6 | 0.08 | ○ | 0.3 | −0.3 | 25.5 | 12.6 |
| | 7 | 0.08 | ○ | 0.3 | −0.3 | 25.5 | 12.6 |
| | 8 | 0.08 | ○ | 0.3 | −0.3 | 25.5 | 12.6 |
| | 9 | 0.08 | ○ | 0.3 | −0.3 | 25.5 | 12.6 |
| Comparative | 1 | 0.70 | ○ | −3.1 | 3.9 | 13.1 | 11.8 |
| Example | 2 | 0.08 | x | 14.8 | −19.7 | 35.0 | −11.7 |
| | 3 | 0.08 | x | 6.2 | −8.3 | 31.4 | 4.7 |
| | 4 | — | — | — | — | — | — |
| | 5 | — | — | — | — | — | — |
| | 6 | — | — | — | — | — | — |
| | 7 | 0.18 | ○ | 0.5 | −0.2 | 25.8 | 12.5 |
| | 8 | 0.32 | ○ | 0.0 | −0.1 | 25.3 | 12.9 |

Example 1

A bearing matrix made of a φ8.5 mm×φ14 mm×5 mm sintered metal (Fe: 98.5 wt %-Cu: 1.5 wt %, average size of pores: 125 μm, average depth: 20 μm, proportion of depressions: 30%, linear expansion coefficient: $1.1 \times 10^{-5}$/° C.) was prepared. This bearing matrix was placed in a mold for injection molding, and the following resin composition (slide material composition) was used to form a resin layer (slide layer) on the inner peripheral surface of the bearing matrix by the following method so as to manufacture a φ8 mm×φ14 mm×5 mm composite slide bearing (linear expansion coefficient of resin composition: $1.3 \times 10^{-4}$/° C., thickness of resin layer: 250 μm). Tests were conducted by using the obtained composite slide bearing under the following conditions. The test results are shown in Table 1.

<Resin Material>

The Lubmer L5000 (polyethylene resin) manufactured by Mitsui Chemicals, Inc. was used as a base material. The KF96H-6000 (silicone oil) manufactured by Shin-Etsu Chemical Co., Ltd. was used as a lubricant, and the Sunsphere H33 manufactured by ASAHI GLASS CO., LTD. was used as a porous silica. 31.6 wt % of a mixture of the porous silica and the silicone oil in a weight ratio of 1:2.76 and 68.4 wt % of the polyethylene resin were melt-kneaded together by a twin-screw extruder to prepare a pellet.

<Insert Molding Conditions>

The bearing matrix having a predetermined shape was fixed in the mold, and the above oil-containing pellet was used to carry out insert molding. At that time, the mold temperature was 100° C., the molding temperature was 210° C., and the injection pressure was 140 MPa.

<Test Conditions>

[Friction/Wear Test]

The A5056 (aluminum alloy, Ra=0.8 μm) shaft member having a diameter of φ7.98 mm was used as a mating member. The face pressure during the test was 1 MPa (calculated in terms of projection area), the peripheral speed was 3 m/min, the testing temperature was 30° C., and the testing time was 120 hours. The measurement items were the amount of specific wear of the test bearing, the existence of the wear of the shaft and the dynamic friction coefficient at the end of the test.

The space between the shaft member and the slide bearing was set to 20 μm (measured at 20° C.).

[Measurement of Dimensional Change in Inner Diameter]

In order to check the influence upon expansion of heat, the outer diameter of the slide bearing was restricted by a sintered metal so that only the inner diameter of the slide bearing could change, and the temperature was changed from −10° C. to 60° C. to measure how much the inner diameter changed (changes in size at −10° C. ad 60° C. were obtained based on the standard size at 20° C.). Changes in the inner diameter of the specimen at each temperature and changes in the size of the shaft member were measured, and the slide bearing was judged as ○ when the space was 0 to 30 μm and as x when the space was less than 0 (adhesion to the shaft occurred) or 30 μm or more.

[Measurement of Space]

The space between the resin layer and the A5056 shaft member inserted was measured at −10° C. and 60° C. The initial space was set to 15 μm. A change in the size of the shaft member was −5.2 μm (at −10° C.) and 7 μm (at 60° C.) (linear expansion coefficient of the shaft material was $2.2 \times 10^{-5}/°$ C.).

Example 2

A φ8 mm×φ14 mm×t5 mm composite slide bearing was manufactured in the same manner as in Example 1 except that the thickness of the resin layer was changed to 500 μm. Tests were conducted by using the obtained composite slide bearing under the above conditions. The test results are shown in Table 1.

Example 3

A φ8 mm×φ14 mm×t5 mm composite slide bearing was manufactured in the same manner as in Example 1 except that the thickness of the resin layer was changed to 770 μm. Tests were conducted by using the obtained composite slide bearing under the above conditions. The test results are shown in Table 1.

Example 4

A φ8 mm×φ14 mm×t5 mm composite slide bearing was manufactured in the same manner as in Example 1 except that the thickness of the resin layer was changed to 900 μm. Tests were conducted by using the obtained composite slide bearing under the above conditions. The test results are shown in Table 1.

Example 5

A φ8 mm×φ14 mm×t5 mm composite slide bearing was manufactured in the same manner as in Example 1 except that the thickness of the resin layer was changed to 1,150 μm. Tests were conducted by using the obtained composite slide bearing under the above conditions. The test results are shown in Table 1.

Example 6

A φ8.5 mm×φ14 mm×t5 mm composite slide bearing (thickness of resin layer: 250 μm) was manufactured in the same manner as in Example 1 except that a bearing matrix made of a φ8.5 mm×φ14 mm×t5 mm sintered metal (Fe: 98.5 wt %-Cu: 1.5 wt %, average size of pores: 250 μm, average depth: 50 μm, proportion of depressions: 50%, linear expansion coefficient: $1.1 \times 10^{-5}/°$ C.) was used. Tests were conducted by using the obtained composite slide bearing under the above conditions. The test results are shown in Table 1.

Example 7

The bearing matrix of the composite slide bearing manufactured in Example 1 was impregnated with silicone oil (KF96H manufactured by Shin-Etsu Chemical Co., Ltd.). Tests were conducted by using this under the above conditions. The test results are shown in Table 1.

Example 8

Annular depressions (width×length×depth=1 mm×5 mm×150 μm, sectional form: semicircular, installation sites: 3 locations equally spaced apart from one another in the axial direction) were formed in the resin layer which constitutes the inner peripheral surface of the composite slide bearing manufactured in Example 1. The proportion of the apparent area occupied by each depression to the total area of the inner wall was $\{(1 \text{ mm} \times 5 \text{ mm})/(8 \text{ mm} \times 5 \text{ mm} \times \pi)\} \times 100 = 3.97\%$. Tests were conducted by using this under the above conditions. The test results are shown in Table 1.

Example 9

The bearing matrix of the composite slide bearing manufactured in Example 8 was impregnated with silicone oil (KF96H manufactured by Shin-Etsu Chemical Co., Ltd.). Tests were conducted by using this under the above conditions. The test results are shown in Table 1.

Comparative Example 1

A bearing matrix made of a φ8 mm×φ14 mm×t5 mm sintered metal (Fe: 98.5 wt %-Cu: 1.5 wt %, average size of pores: 250 μm, average depth: 50 μm, proportion of depressions: 30%, linear expansion coefficient: $1.1 \times 10^{-5}/°$ C., Cu—Sn-based) was used as a slide bearing. This sintered metal bearing was immersed in ester oil (H481R manufactured by NOF Corporation) to carry out vacuum impregnation so as to impregnate the oil into pores. Various tests were conducted by using this test bearing under the same conditions as in Example 1. The test results are shown in Table 1.

Comparative Example 2

A φ8 mm×φ14 mm×t5 mm slide bearing was manufactured from the resin composition alone used in Example 1 and a friction/wear test and various evaluation tests were carried out under the same conditions as in Example 1. The test results are shown in Table 1.

Comparative Example 3

A bearing matrix made of a φ11.2 mm×φ14 mm×t5 mm sintered metal (Fe: 98.5 wt %-Cu: 1.5 wt %, average size of pores: 250 μm, average depth: 50 μm, proportion of depressions: 30%, linear expansion coefficient: $1.1 \times 10^{-5}/°$ C.) was prepared. This bearing matrix was placed in a mold for injection molding, and the resin composition of Example 1 was insert-molded on the inner peripheral surface of the above bearing matrix to manufacture a φ8 mm×φ14 mm×t5 mm composite slide bearing (thickness of resin layer: 1,600 μm).

Various tests were conducted under the same conditions as in Example 1. The test results are shown in Table 1.

Comparative Example 4

A φ8 mm×φ14 mm×t5 mm composite slide bearing (thickness of resin layer: 500 μm) was manufactured in the same manner as in Example 3 except that a bearing matrix made of φ9 mm×+14 mm×t5 mm SUS304 (surface roughness Ra=0.01 μm) was used. Since peeling occurred between the bearing matrix and the resin layer of the obtained composite slide bearing, the tests could not be conducted.

Comparative Example 5

A φ8 mm×φ14 mm×t5 mm composite slide bearing (thickness of resin layer: 250 μm) was manufactured in the same manner as in Example 1 except that a bearing matrix made of a φ8.5 mm×φ14 mm×t5 mm sintered metal (Fe: 98.5 wt %-Cu: 1.5 wt %, average size of pores: 250 μm, average depth: 100 μm, proportion of depressions: 10%, linear expansion coefficient: $1.1 \times 10^{-5}$/° C.) was used. Since peeling occurred between the bearing matrix and the resin layer of the obtained composite slide bearing, the tests could not be conducted.

Comparative Example 6

A φ8 mm×φ14 mm×t5 mm composite slide bearing (thickness of resin layer: 250 μm) was manufactured in the same manner as in Example 1 except that a bearing matrix made of a φ8.5 mm×φ14 mm×t5 mm sintered metal (Fe: 98.5 wt %-Cu: 1.5 wt %, average size of pores: 3 μm, average depth: 1 μm, proportion of depressions: 30%, linear expansion coefficient: $1.1 \times 10^{-5}$/° C.) was used. Since peeling occurred between the sintered metal layer and the resin layer of the obtained composite slide bearing, the tests could not be conducted.

Comparative Example 7

A φ8 mm×φ14 mm×t5 mm composite slide bearing (thickness of resin layer: 250 μm) was manufactured in the same manner as in Example 1 except that the resin layer was made of a polyethylene resin alone (Lubmer L5000 manufactured by Mitsui Chemicals, Inc.). Tests were conducted by using the obtained composite slide bearing under the above conditions. The test results are shown in Table 1.

Comparative Example 8

A φ8 mm×φ14 mm×t5 mm composite slide bearing (thickness of resin layer: 250 μm) was manufactured in the same manner as in Example 1 except that the resin layer was made of a polyacetal resin alone (DURACON M90-02 manufactured by Polyplastics Co., Ltd., linear coefficient: $1.0 \times 10^{-4}$/° C.). Tests were conducted by using the obtained composite slide bearing under the above conditions. The test results are shown in Table 1.

(Results)

when the fe-based sintered metal having a suitable pore size, depth and proportion of depressions and the resin layer including silicone oil, a porous silica and polyethylene were used as shown in Examples 1 to 9, peeling caused by insufficient adhesion did not occur between the sintered metal and the resin layer. The amount of specific wear was $100 \times 10^{-8}$ mm$^3$/(N·m) or less, which is small, the mating member (shaft member) was not worn down, and the dynamic friction coefficient was 0.2 or less. The dimensional stability was excellent with a small dimensional change by heat expansion.

In contrast to this, when the slide bearing was composed of a sintered metal layer alone like Comparative Example 1, the shaft member was worn down, and the friction coefficient was high at 0.7 though a dimensional change was small. When the slide bearing was composed of a resin material alone like Comparative Example 2, the amount of specific wear was small, the shaft member was not worn down, and the friction coefficient was small but a dimensional change by heat expansion was large. Therefore, the slide bearing is not suitable for use in portions which require high accuracy. When the bearing was composed of a resin layer and a sintered metal layer like in Comparative Example 3, the amount of specific wear was small, the shaft member was not worn down, and the friction coefficient was small, but the shape of the bearing is restricted by the metal layer, so due to the large thickness of the resin layer, the volume expansion escaped to the inner diameter side at a high temperature, thereby reducing the inner diameter. As a result, the space between the shaft member and the bearing greatly decreased from the initial value and the adhesion of the bearing to the shaft member occurred disadvantageously. When the slide bearing was composed of SUS304 and the resin layer like in Comparative Example 4, peeling occurred at the interface by molding shrinkage because SU304 had a smooth surface and poor adhesion to the resin layer. When the surface of the metal layer is not rough, it is difficult to obtain a metal-resin composite material. When a sintered metal having a small depression proportion of 3% was used like in Comparative Example 5, peeling occurred at the interface by molding shrinkage because the sintered metal had poor adhesion to the resin layer as in Comparative Example 4 in which SUS304 was used. When pores were as small as 3 μm like in Comparative Example 6, the molten resin could not enter the pores, thereby reducing adhesion with the result that peeling occurred at the interface by molding shrinkage. When the resin layer was made of polyethylene resin alone like in Comparative Example 7, the friction coefficient was relatively small but the amount of wear was large. When the resin layer was made of polyacetal resin alone like in Comparative Example 8, the friction coefficient and the amount of specific wear were large and the worn surface of the mating member (shaft member) was observed.

INDUSTRIAL APPLICABILITY

The slide bearing of the present invention is suitable for use in cam followers, and more particularly, for use in cam followers for office equipment which require rotational accuracy.

What is claimed is:

1. A slide bearing comprising:
a matrix made of a metal; and
a slide layer formed on a predetermined surface of the matrix and having a bearing surface which slides with a shaft member, wherein
the matrix has a contact surface which performs one of rolling and sliding over a mating member and the matrix is made of an Fe-based sintered metal material having an Fe content of 90 weight % or more,
the surface of the matrix on which the slider layer is formed has a surface opening ratio of 20 to 50%, and
the slide layer is formed by insert molding the slide material composition including a resin as a base material on the surface of the matrix.

2. The slide bearing according to claim 1, wherein a product of linear expansion coefficient of slide material composition forming slide layer and thickness of slide layer is 0.15 or less.

3. The slide bearing according to claim 2, wherein
the contact surface is formed on the outer peripheral surface of the matrix;
the slide layer is formed from the inner peripheral surface to the both end surfaces of the matrix;
the bearing surface of the slide layer formed on the inner peripheral surface of the matrix is a radial bearing face for supporting a radial load from the shaft member; and
the bearing surfaces of the slide layer formed on both end faces of the matrix are thrust bearing faces for supporting a thrust load from the shaft member.

4. The slide bearing according to claims 1, wherein the slide material composition forming the slide layer comprises a lubricant.

5. The slide bearing according to claim 4, wherein the lubricant is silicone oil.

6. The slide bearing according to claim 4, wherein the slide material composition forming the slide layer further comprises a porous silica impregnated with a lubricant.

7. The slide bearing according to claim 6, wherein the porous silica is a globular porous silica having interconnected pores.

8. The slide bearing according to claim 7, wherein the globular porous silica has an average particle diameter of 0.5 to 100 μm.

9. The slide bearing according to claim 1, wherein a base material of the slide material composition forming the slide layer is polyethylene resin.

10. The slide bearing according to claim 1, wherein
the contact surface is formed on the outer peripheral surface of the matrix;
the slide layer is formed from the inner peripheral surface to the both end surfaces of the matrix;
the bearing surface of the slide layer formed on the inner peripheral surface of the matrix is a radial bearing face for supporting a radial load from the shaft member; and
the bearing surfaces of the slide layer formed on both end faces of the matrix are thrust bearing faces for supporting a thrust load from the shaft member.

11. A cam follower comprising:
a shaft member cantilevered at one end; and
a slide bearing fitted onto the shaft member,
wherein the slide bearing comprises a matrix made of a metal; and a slide layer formed on a predetermined surface of the matrix and having a bearing surface which slides with a shaft member, wherein
the matrix has a contact surface which performs one of rolling and sliding over a mating member and the matrix is made of an Fe-based sintered metal material having an Fe content of 90 weight % or more,
the surface of the matrix on which the slider layer is formed has a surface opening ratio of 20 to 50%, and
the slide layer is formed by insert molding the slide material composition including a resin as a base material on the surface of the matrix.

12. The cam follower according to claim 11, wherein a product of linear expansion coefficient of slide material composition forming slide layer and thickness of slide layer is 0.15 or less.

13. The cam follower according to claim 12, wherein
the contact surface is formed on the outer peripheral surface of the matrix;
the slide layer is formed from the inner peripheral surface to the both end surfaces of the matrix;
the bearing surface of the slide layer formed on the inner peripheral surface of the matrix is a radial bearing face for supporting a radial load from the shaft member; and
the bearing surfaces of the slide layer formed on both end faces of the matrix are thrust bearing faces for supporting a thrust load from the shaft member.

14. The cam follower according to claim 11, wherein the slide material composition forming the slide layer comprises a lubricant.

15. The cam follower according to claim 14, wherein the lubricant is silicone oil.

16. The cam follower according to claim 14, wherein the slide material composition forming the slide layer further comprises a porous silica impregnated with a lubricant.

17. The cam follower according to claim 16, wherein the porous silica is a globular porous silica having interconnected pores.

18. The cam follower according to claim 17, wherein the globular porous silica has an average particle diameter of 0.5 to 100 μm.

19. The cam follower according to claim 11, wherein a base material of the slide material composition forming the slide layer is polyethylene resin.

20. The cam follower according to claim 11, wherein
the contact surface is formed on the outer peripheral surface of the matrix;
the slide layer is formed from the inner peripheral surface to the both end surfaces of the matrix;
the bearing surface of the slide layer formed on the inner peripheral surface of the matrix is a radial bearing face for supporting a radial load from the shaft member; and
the bearing surfaces of the slide layer formed on both end faces of the matrix are thrust bearing faces for supporting a thrust load from the shaft member.

* * * * *